United States Patent [19]

Shillington

[11] Patent Number: 5,005,532

[45] Date of Patent: Apr. 9, 1991

[54] INTEGRATED TUNED INDUCTION SYSTEM

[75] Inventor: Ronald G. Shillington, Ontario, Canada

[73] Assignee: Siemens-Bendix Automotive Electronics Limited, Chatham, Canada

[21] Appl. No.: 462,601

[22] Filed: Jan. 18, 1990

Related U.S. Application Data

[63] Continuation-in-part of Ser. No. 313,921, Feb. 22, 1989, Pat. No. 4,919,086.

[51] Int. Cl.$^5$ .............................................. F02M 35/10
[52] U.S. Cl. ............................ 123/52 M; 123/52 MC
[58] Field of Search ........ 123/52 M, 52 MV, 52 MC, 123/52 MB, 52 MF

[56] References Cited

U.S. PATENT DOCUMENTS

| | | | |
|---|---|---|---|
| 2,845,911 | 8/1958 | Gill | 123/52 MV |
| 4,440,120 | 4/1984 | Butler | 123/52 M |
| 4,446,823 | 5/1984 | Bessho | 123/52 MB |
| 4,617,897 | 10/1986 | Sasaki et al. | 123/52 MB |
| 4,619,226 | 10/1986 | Ueda et al. | 123/52 MC |
| 4,765,286 | 8/1988 | Lyjak et al. | 123/52 MC |
| 4,854,271 | 8/1989 | Miyano et al. | 123/52 MV |
| 4,867,110 | 9/1989 | Distelrath | 123/52 MC |
| 4,875,438 | 10/1989 | Suzuki et al. | 123/52 MB |
| 4,907,547 | 3/1990 | Daly | 123/52 M |

FOREIGN PATENT DOCUMENTS 253305   7/1966   Fed. Rep. of Germany ........ 123/52 MV

*Primary Examiner*—David A. Okonsky
*Attorney, Agent, or Firm*—George L. Boller; Russel C. Wells

[57] ABSTRACT

A plenum is surrounded by runners that spiral around the plenum sidewall to the entrances to the engine cylinders. The circumferential extent of each runner exceeds 360 degrees about a longitudinal axis of the plenum. Portions of the runners share common wall portions with portions of the plenum.

17 Claims, 5 Drawing Sheets

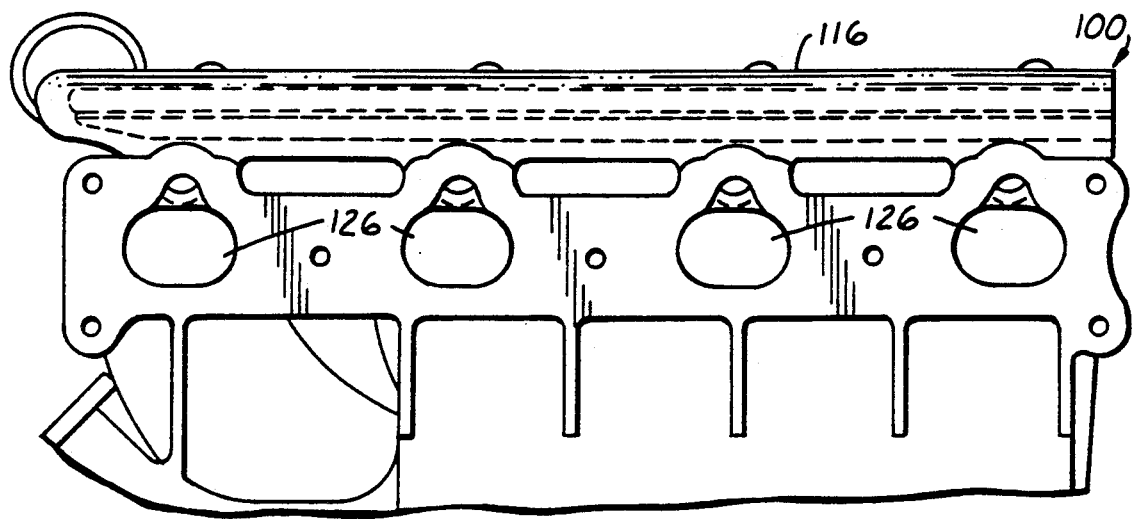
FIG.6
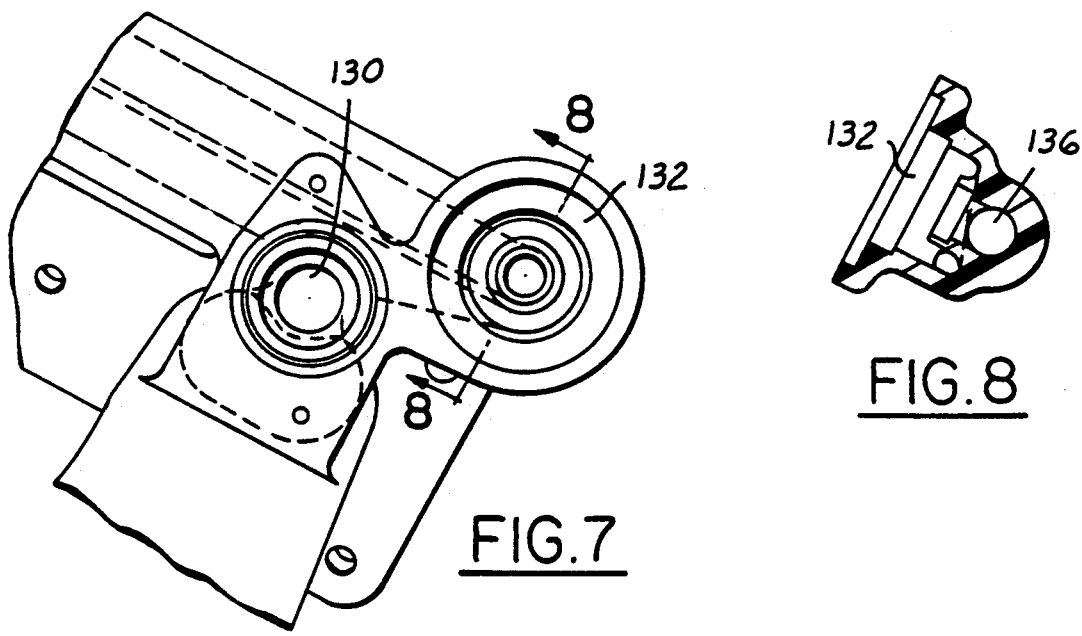
FIG.7
FIG.8
FIG.9

INTEGRATED TUNED INDUCTION SYSTEM

CROSS-REFERENCE TO RELATED APPLICATION

This application is a continuation-in-part of allowed application Ser. No. 07/313,921, filed Feb. 22, 1989, and now U.S. Pat. No. 4,919,086.

BACKGROUND AND SUMMARY OF THE INVENTION

This invention relates generally to the air induction systems of internal combustion engines and more specifically it relates to an integrated tuned air induction system.

It is a known fact that performance of an internal combustion engine can be improved by tuning the air induction system. Such tuning involves the use of runners, or tubes, of particular lengths. In an automobile however, the packaging of tuned tubes, or runners, is a challenge to engineers and designers.

The state of the art is represented by patents cited in the file of the parent application. They are: 4,254,746; 4,497,287; 4,516,538; 4,523,560; 4,643,138; 4,664,075; 4,669,428; 4,719,879; 4,760,703; 4,776,313; and 4,829,944.

The present invention relates to a tuned air induction system in which various component parts are packaged into an integrated system. The present invention is well suited to enable a tuned air induction system to be implemented in an automobile with the objective of simplifying manufacturing and assembly procedures.

The foregoing features, advantages and benefits of the invention, along with additional ones, will be seen in the ensuing description and claims which should be considered in conjunction with the accompanying drawings. The drawings disclose a presently preferred embodiment of the invention according to the best mode contemplated at the present time in carrying out the invention.

BRIEF DESCRIPTION OF THE DRAWINGS

FIG. 6 is a fragmentary view looking in the direction of arrows 6—6 in FIG. 5.

FIG. 7 is a fragmentary view, on an enlarged scale, looking in the direction of arrow 7 in FIG. 5.

FIG. 8 is a cross-sectional view taken in the direction of arrows 8—8 in FIG. 7.

FIG. 9 is a cross-sectional view taken in the direction of arrows 9—9 in FIG. 4.

DESCRIPTION OF THE PREFERRED EMBODIMENT

Figure 1:
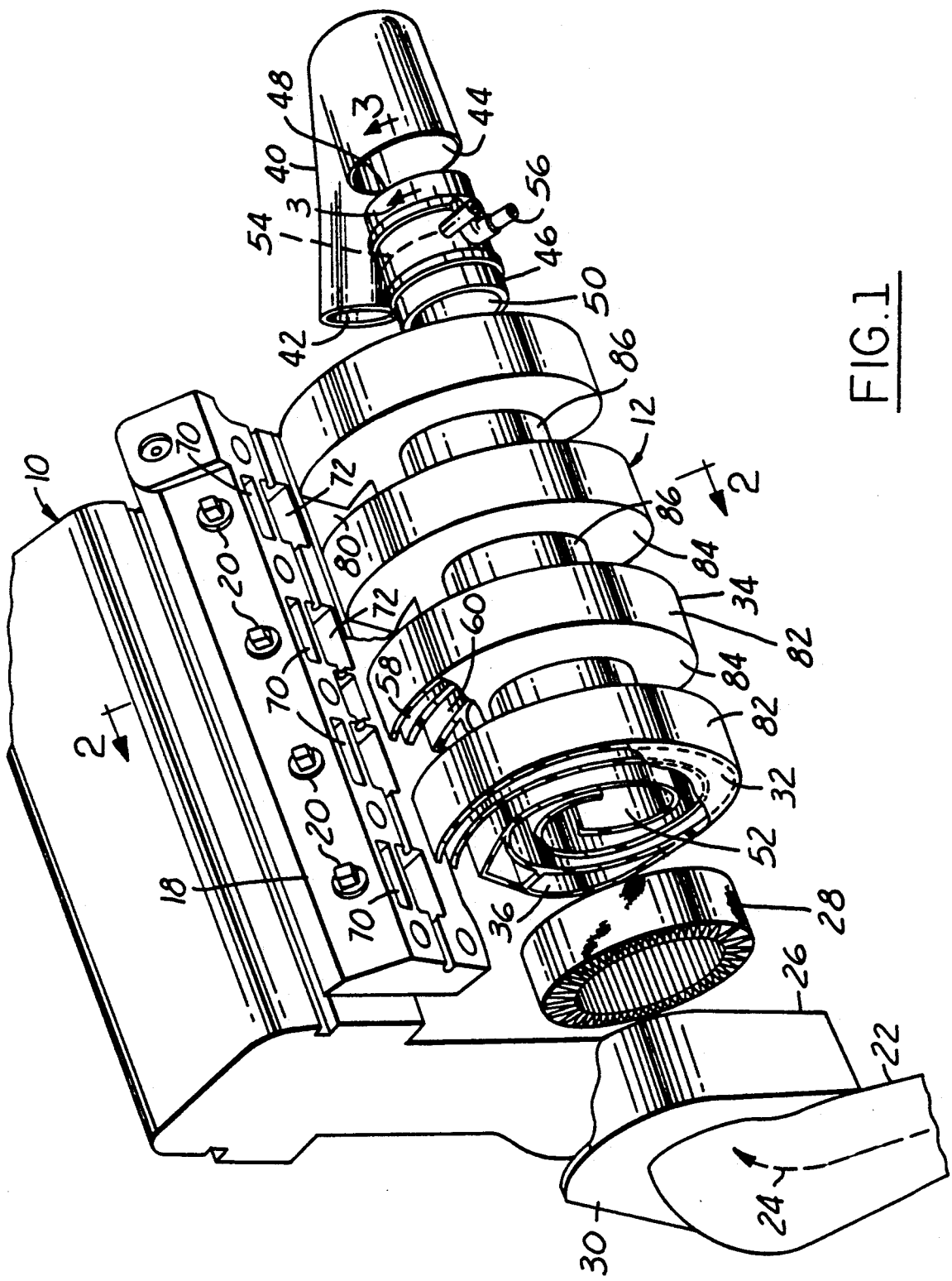
FIG. 1 is a perspective view, having portions exploded and broken away, illustrating an integrated tuned air induction system according to the present invention.
Figure 2:
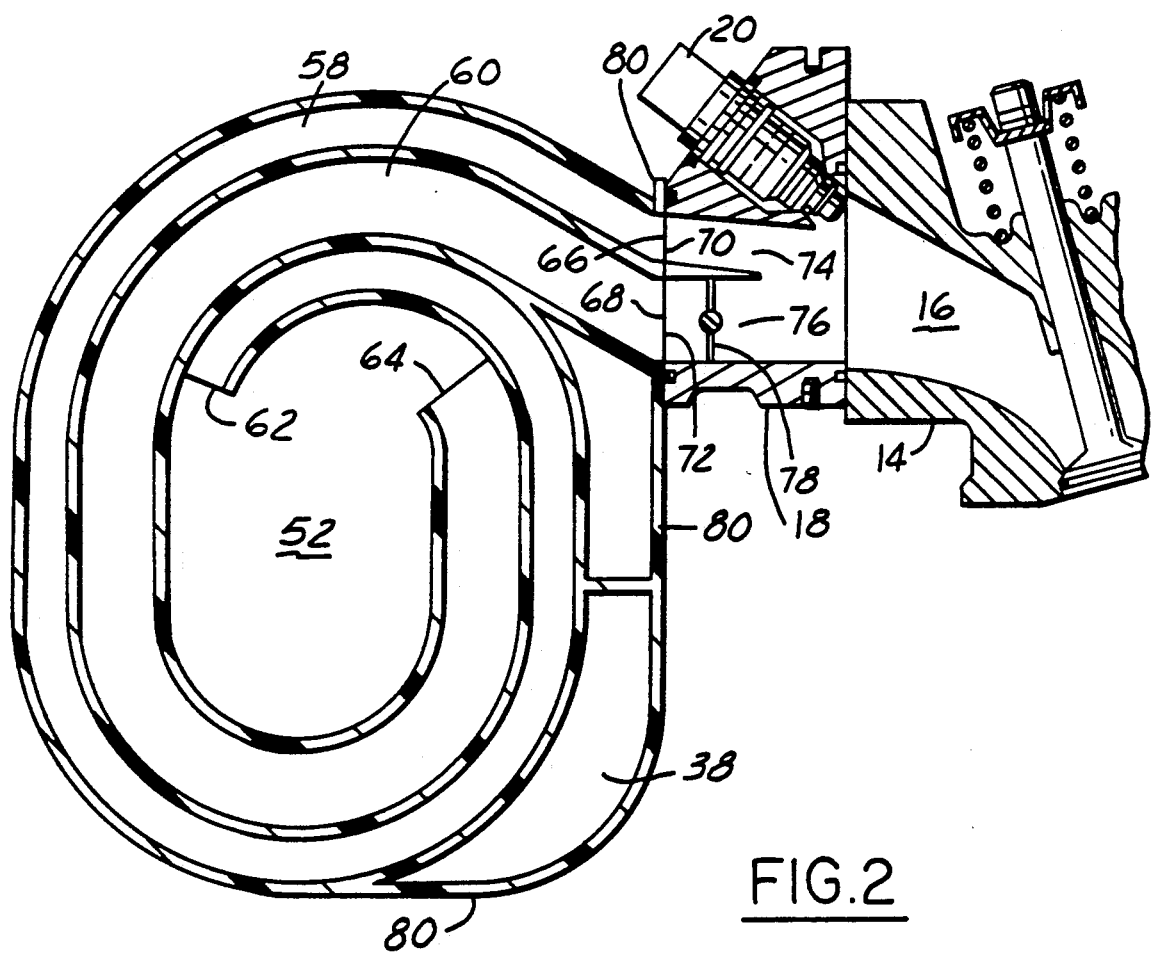
FIG. 2 is a transverse cross-sectional view on an enlarged scale illustrating the components in assembly and taken generally in the direction of arrows 2—2 in FIG. 1.

The drawings show by way of example a four cylinder internal combustion engine 10 with which is associated an integrated tuned air induction system 12. The engine has a cylinder head 14 containing an intake port 16 via which a combustible air-fuel mixture enters each engine cylinder. Air passes through system 12 and through air passages in a fuel rail block 18 that is fastened to cylinder head 14. The fuel rail block contains four electromagnetic fuel injectors 20, each of which is poised to spray fuel in suitably timed relation to the engine operation into each intake port 16 for mixture with air that has passed through system 12.

System 12 comprises an air intake 22 through which air enters an air filter compartment in the direction indicated by the arrow 24. The air filter compartment comprises a cover 26 that fits over an annular air filter element 28 to capture the air filter element between an annular end wall 30 of cover 26 and an imperforate end wall 32 of a main body part 34. The airflow passes radially outwardly through the air filter element 28 and enters the entrance end 36 of a tube 38 that forms a passage running parallel to engine 12 and passing the four cylinders that are served by the integrated tuned air induction system 12. Wall 32 is shown broken away in FIG. 1, and it is to be understood that this wall covers the end of body 34 except for the entrance end 36 of tube 38. Alternately, the air filter element could be a panel type element fitting diagonally within the compartment with the upper edge sealing against wall 32, the lower edge sealing against wall 30, and the side edges sealing against the sides of the cover.

The exit end of tube 38 cannot be directly seen in FIG. 1, but it is at the far end of main body 34. Tube 38 has a substantially constant cross-sectional area throughout its length and forms part of the tuning system. An extension piece 40 has an entrance end 42 that is fitted to the exit end of tube 38. Extension piece 40 provides a means to create approximately a 180° turn in the airflow after the flow has passed through tube 38. The outlet or exit end 44 of extension piece 40 has a circular shape and faces in a direction that is parallel to the direction in which the entrance end 42 faces. Extension piece 40 serves to maintain the cross-sectional area of tube 38 substantially constant so that the extension piece 40 also forms a part of the tuning system even though the shape of the cross-section changes.

Figure 3:
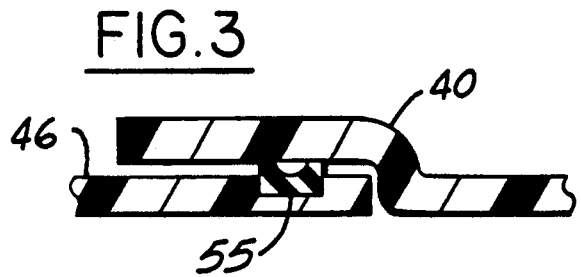
FIG. 3 is a fragmentary cross-sectional view on an enlarged scale taken in the direction of arrows 3—3 in FIG. 1.

A circular cylindrical air body 46 has an entrance end 48 that fits to the exit end 44 of extension piece 40, and it also has an outlet or exit end 50 that fits to the entrance end of a plenum zone 52. That entrance end of plenum zone 52 is at the far end of main body 34. The plenum zone 52 lies parallel to tube 38 and passes the four engine cylinders that are served by induction air system 12. Wall 32 closes the near end of the plenum zone. The air body 46 contains a butterfly 54 that is positioned by means of a lever 56 to control the airflow through air induction system 12. The exit end 44 of piece 40 has a circular shape that provides a slip fit with the entrance end of air body 46, and the entrance of plenum zone 52 also has a shape that provides a slip fit with the exit end of air body 46. The slip fit joint between air body 46 and extension piece 40 is shown in FIG. 3 and comprises a circular seal 55 that seals a radially facing surface of the air body with an opposite facing surface of the extension piece.

Main body 34 comprises four pairs of spiral runners that serve to communicate plenum zone 52 with corresponding cylinders of engine 10. Each pair of runners comprises a longer and narrower runner 58 and a shorter and wider runner 60. The shorter and wider runner is arranged in a nested fashion within the longer and narrower one so that they share a common wall. Each runner 58, 60 has a corresponding entrance 62, 64 that is in communication with plenum zone 52. The exit end 66, 68 of each runner 58, 60 in main body 34 is disposed at a corresponding entrance, 70, 72 respectively, in fuel rail block 18, and the fuel rail block has passages, 74 and 76 respectively, that constitute the terminations of the runners.

The runners 58 and 60 are also part of the tuning system. A wave deflector 78 is disposed in fuel rail block 18 at the termination of each runner 60. The wave deflectors are operated by an actuator (not shown) for opening and closing runners 60. In this way selective tuning of the air induction system may be accomplished.

A further feature of the main body 34 is that it includes a wall 80 that aids in the mounting and support of the main body from the engine. This wall 80 in general extends downwardly from the outer face of fuel rail block 18, forms the outer wall of tube 38 and extends outwardly around the bottom of the main body to provide a cradle-like support for the runners. Wall 80 has apertures for the exit ends of the runners 58, 60.

The main body 34, which comprises tube 36, plenum zone 52, runners 58, 60, and wall 80, may be fabricated as a one-piece plastic part by a suitable manufacturing technique, and by way of example, lost core molding may be one such suitable technique.

It will also be observed that the runners comprise outer walls 82 and side walls 84. Between the side walls 84 of adjacent pairs of runners the plenum zone 52 comprises an outer wall 86.

FIGS. 4–14 present a portion of another embodiment that is designated by the general reference 100. Specifically, these Figures disclose a single part 102 in which a plenum entrance section 104, a plenum 106, four spiral runners 108, 110, 112, 114, and a fuel rail 116 are integrated. Like the corresponding part of the first embodiment of FIG. 1, part 102 is fabricated from suitable plastic material by a suitable technique such as lost core molding. Not shown in FIGS. 4–14 are those portion of the system that are upstream of entrance section 104, namely the air body and air filter compartment, nor is the engine to which fuel rail 116 attaches shown. Also not shown are the fuel injectors and the fuel pressure regulator which are assembled to the fuel rail in the functioning system.

Entrance section 104 has a generally circular cross-sectional shape and begins at a flange 118 that provides for attachment to the non-illustrated upstream components. From flange 118 the entrance section continues along a curved path and opens into one lengthwise end of plenum 106.

Plenum 106 may be considered to have a generally cylindrical walled shape extending from entrance section 104 to the other lengthwise plenum end which is fully closed. As viewed in transverse cross section through the plenum, the plenum sidewall is generally uniform in shape and size throughout its full length, except for the approximately one-quarter of its length that lies immediately contiguous entrance section 104. That particular portion contains a slight indentation 120 (FIG. 4) that has been designed into this particular embodiment for the purpose of providing clearance to closely adjacent engine compartment structure (not shown) which would otherwise interfere with part 100 in the absence of indentation 120.

The four runners extend spirally about the plenum to establish communication between the plenum and the entrance to a corresponding engine cylinder when the part 102 is functionally installed on an engine. For convenience of description, let it be assumed that the reference numeral 122 (FIG. 10) denotes a particular longitudinal plenum axis that is located generally centrally of the plenum. As viewed transversely of axis 122, each runner has a beginning 124 that is in communication with the plenum at about the 11 o'clock position as viewed in the direction of FIG. 10. Each runner is arranged generally transversely of the plenum, with the length of each runner extending in a spiral manner around the plenum. According to an aspect of the inventive principles, each runner 108, 110, 112, 114 spirals in excess of 360 degrees about axis 122 to terminate in an ending 126 that is placed in communication with the entrance of a corresponding engine cylinder when part 102 is assembled to an engine.

In the particular configuration that is illustrated by FIGS. 4–14, the spacing distance between the runner endings 126, which is established by the particular engine design, exceeds the spacing distance between the runner beginnings 124, which in this instance may be considered nil since the runner beginnings are immediately contiguous with immediately adjacent runners sharing common wall portions. Therefore, while each runner has essentially zero lead as it spirals from its 11 o'clock beginning to approximately 9 or 10 o'clock, each runner has a different lead from the 9 or 10 o'clock position to its ending 126. This lead progressively increases in succession from runner to runner, being quite small for runner 108, but largest for runner 114. Hence, a segment of runner 108 immediately contiguous its ending 126 almost fully overlaps a segment that is immediately contiguous its beginning 124; a segment of each remaining runner immediately contiguous its ending partially overlaps a segment that is immediately contiguous its beginning; and the percentage of overlap of each runner becomes progressively less in succession from runner 108 to runner 114.

Figure 10:
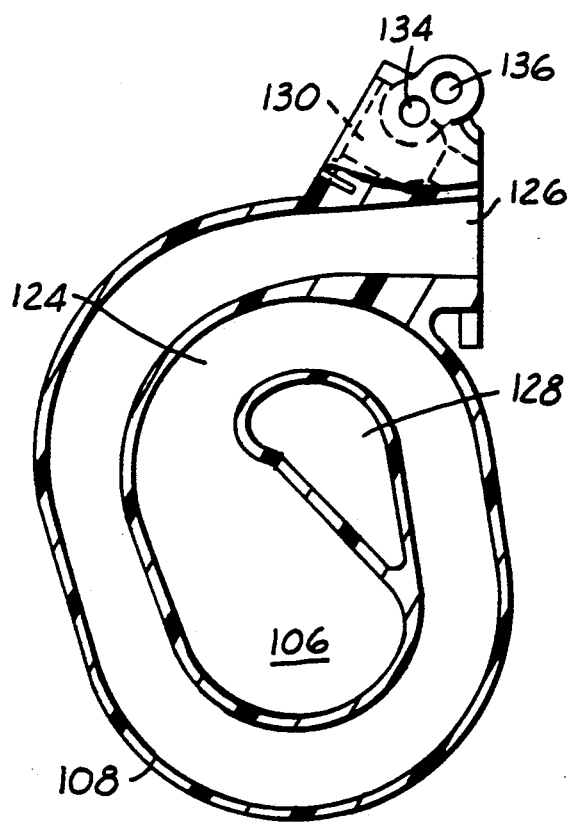
FIG. 10 is a cross-sectional view taken in the direction of arrows 10—10 in FIG. 4.
Figure 11:
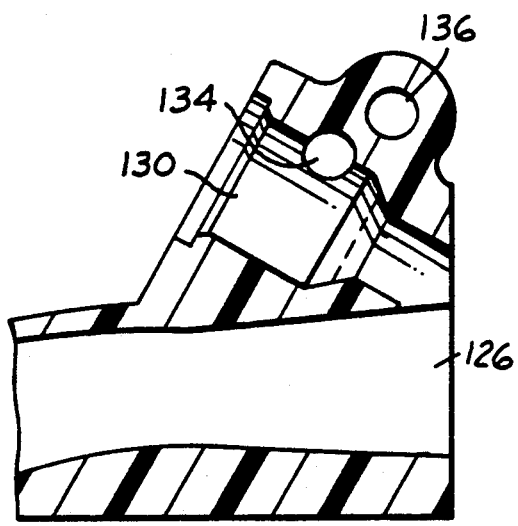
FIG. 11 is a cross-sectional view taken in the direction of arrows 11—11 in FIG. 4.
Figure 13:
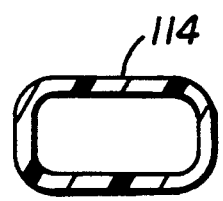
FIG. 13 is a cross-sectional view taken in the direction of arrows 13—13 in FIG. 5.
Figure 12:
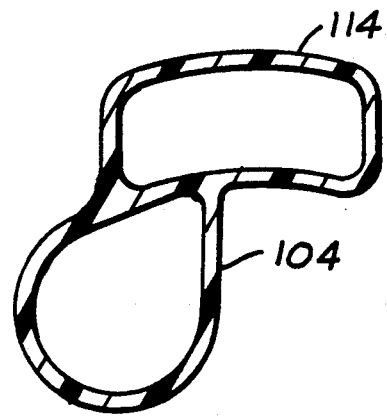
FIG. 12 is a cross-sectional view taken in the direction of arrows 12—12 in FIG. 4.
Figure 14:
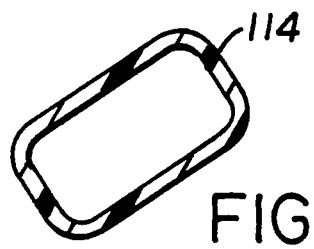
FIG. 14 is a cross-sectional view taken in the direction of arrows 14—14 in FIG. 5.

As can be seen in FIG. 10, a portion of runner 108 and a portion of plenum 106 share a common wall; the same holds true for each of the other runners. The construction does however have a void 128 where there is no wall sharing.

Figure 4:
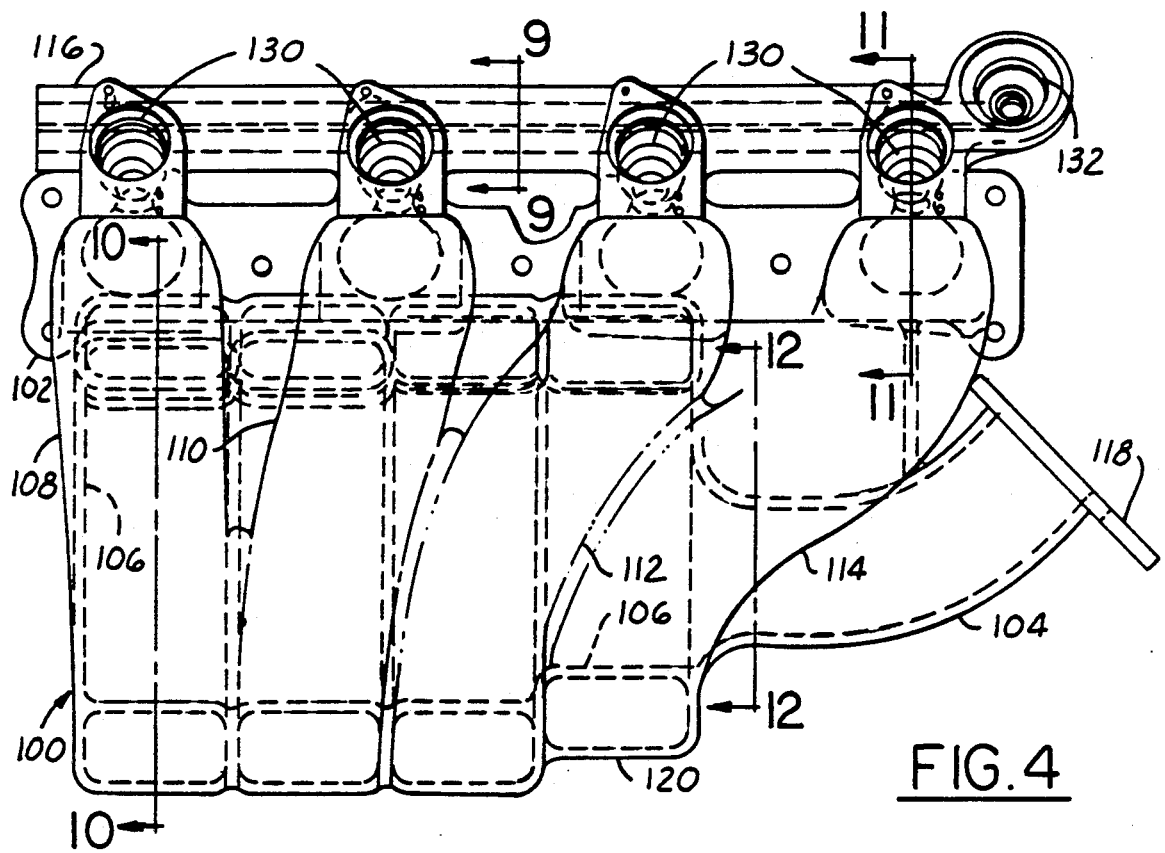
FIG. 4 is a top plan view of a further embodiment of a portion of an engine air induction system.
Figure 5:
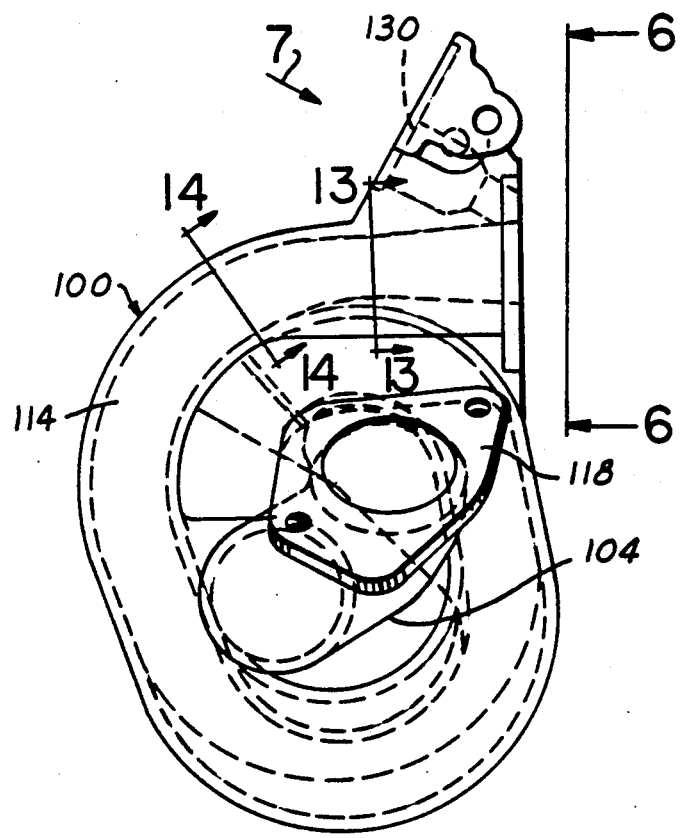
FIG. 5 is a right end view of FIG. 4.

Fuel rail 116 integrally merges with the end segments of the runners and comprises four injector sockets 130, each associated with a corresponding runner. Each socket is adapted to receive a corresponding electromagnetic fuel injector (not shown). The fuel rail further comprises a fuel pressure regulator socket 132 adapted to receive a fuel pressure regulator (not shown). Running along the length of the fuel rail from separate ports at the left-hand end as viewed in FIG. 4 are a fuel supply passage 134 and a fuel return passage 136. The fuel supply passage is in communication with sockets 13 and serves to convey liquid fuel to the injectors when the injectors are functionally installed in the sockets. The supply passage is communicated with the inlet to a fuel pressure regulator when the regulator is functionally associated with its socket 132. Excess fuel is returned from the pressure regulator to the fuel tank (not shown) via return passage 136.

It should be understood and appreciated that the specific embodiments that have been illustrated and described are representative of the inventive principles and that other equivalent embodiments will fall within the scope of the accompanying claims.

What is claimed is:

1. In an induction air circuit for a multi-cylinder internal combustion engine the combination comprising a plenum zone that is supplied with air from an air intake, and spiral runners leading from said plenum zone and through which air is supplied from said plenum zone to individual engine cylinders, said runners laterally bounding said plenum zone at locations along the length of said plenum zone, and at least one of said runners, when viewed in transverse cross section through said plenum zone, having a beginning at a given circumferential location about a longitudinal axis of said plenum zone and spiraling from said beginning in excess of 360 degrees about said longitudinal axis of said plenum zone to terminate at an ending that is in excess of 360 degrees about said longitudinal axis of said plenum zone as measured along the length of said at least one runner, wherein each of said runners, when viewed in transverse cross section through said plenum zone, has a beginning at a given circumferential location about said longitudinal axis of said plenum zone and spirals from its beginning in excess of 360 degrees about said longitudinal axis of said plenum zone to terminate at a corresponding ending that is in excess of 360 degrees about said longitudinal axis of said plenum zone as measured along the length of each said runner, wherein said plenum zone and runners are a single plastic part, and further including a fuel rail that is embodied in said single plastic part and which merges with the endings of said runners.

2. In an induction air circuit for a multi-cylinder internal combustion engine the combination comprising a plenum zone that is supplied with air from an air intake, and spiral runners leading from said plenum zone and through which air is supplied from said plenum zone to individual cylinders, said runners laterally bounding said plenum zone at locations along the length of said plenum zone, at least one of said runners having an air entrance at said plenum zone and spiraling from said air entrance in excess of 360 degrees about a longitudinal axis of said plenum zone to an air exit through which air passes to an engine cylinder, a first segment of said at least one runner and a second segment of said at least one runner which is disposed at least 360 degrees about said axis from said first segment sharing a common wall portion, and wherein said plenum zone and runners are embodied in a single plastic part.

3. In an induction air circuit for a multi-cylinder internal combustion engine the combination comprising a plenum zone that is supplied with air from an air intake, and spiral runners leading from said plenum zone and through which air is supplied from said plenum zone to individual cylinders, said runners laterally bounding said plenum zone at locations along the length of said plenum zone, at least two of said runners being arranged as to a nested set in which they share a common wall portion extending along at least portions of their respective lengths, said nested set having air entrance means at said plenum zone and spiraling therefrom in excess of 360 degrees about a longitudinal axis of said plenum zone to air exit means through which air exits the runners of said nested set, said nested set comprising a first segment and a second segment, said second segment being disposed at least 360 degrees about said axis from said first segment, said first and second segments sharing a further common wall portion other than said first-mentioned common wall portion, and wherein said plenum zone and runners are embodied in a single plastic part.

4. In an induction air circuit for a multi-cylinder internal combustion engine the combustion comprising a plenum zone that is supplied with air from an air intake, and spiral runners leading from said plenum zone and through which air is supplied from said plenum zone to individual engine cylinders, said runners laterally bounding said plenum zone at locations along the length of said plenum zone, and at least one of said runners, when viewed in transverse cross section through said plenum zone, having a beginning at a given circumferential location about a longitudinal axis of said plenum zone and spiraling from said beginning in excess of 360 degrees about said longitudinal axis of said plenum zone to terminate at an ending that is in excess of 360 degrees about said longitudinal axis of said plenum zone as measured along the length of said at least one runner, wherein said at least one runner and another runner share a common wall portion along at least portions of their respective lengths, said plenum zone and runners are a single plastic part, and a first segment of said at least one runner shares a common wall portion with a second segment thereof which is disposed at least 360 degrees from said first segment as measured about said longitudinal axis of said plenum zone.

5. The combination set forth in claim 4 wherein said beginning is disposed approximately at the 11 o'clock position as viewed axially of said plenum zone.

6. The combination set forth in claim 4 further including a fuel rail that is embodied in said single plastic part and which merges with the endings of said runners.

7. The combination set forth in claim 4 wherein each of said runners, when viewed in transverse cross section through said plenum zone, has a beginning at a given circumferential location about said longitudinal axis of said plenum zone and spirals from its beginning in excess of 360 degrees about said longitudinal axis of said plenum zone to terminate at a corresponding ending that is in excess of 360 degrees about said longitudinal axis of said plenum zone as measured along the length of each said runner.

8. The combination set forth in claim 7 wherein each beginning is disposed approximately at the same circumferential position about said longitudinal axis of said plenum zone as viewed axially of said plenum zone.

9. The combination set forth in claim 8 wherein the same circumferential position about said longitudinal axis of said plenum zone where each of said beginnings is disposed is approximately at 11 o'clock.

10. The combination set forth in claim 4 wherein the endings of said runners are spaced apart along the direction of said axis at a spacing distance from each other that exceeds the spacing distance along the direction of said axis between their beginnings.

11. In an induction air circuit for a multi-cylinder internal combustion engine the combination comprising a plenum zone that is supplied with air from an air intake, and spiral runners leading from said plenum zone and through which air is supplied from plenum zone to individual engine cylinders, said runners laterally bounding said plenum zone at locations along the length of said plenum zone, and each of at least certain ones of said runners, when viewed in transverse cross section through said plenum zone, having a beginning at a given circumferential location about a longitudinal axis of said plenum zone and spiraling from said beginning about said longitudinal axis of said plenum zone to terminate at an ending that is disposed a certain number of degrees about said longitudinal axis of said plenum zone as measured along the runner's length, wherein said plenum zone and runners are a single plastic part and wherein segments of said at least certain ones of said runners are immediately contiguous along the direction of said axis, each immediately contiguous pair of such segments sharing a common wall portion that separates the segments of such pair along the direction of said axis.

12. The combination set forth in claim 11 wherein said certain number of degrees is in excess of 360 degrees.

13. The combination set forth in claim 11 wherein said segments are immediately contiguous the beginnings of their respective runners.

14. The combination set forth in claim 13 wherein the endings of said at least certain ones of said runners are spaced apart along the direction of said axis.

15. The combination set forth in claim 14 wherein the overall length of said plenum zone along the direction of said axis is less than the overall distance along the direction of said axis that is spanned by the endings of said at least certain ones of said runners.

16. The combination as set forth in claim 15 wherein said at least certain ones of said runners spiral in a helical manner about said axis such that the span of each such helically spiraling runner in the direction along said axis successively increases from runner to runner, said plenum zone being disposed lengthwise along the direction of said axis such that one of its lengthwise ends is disposed lengthwise along the direction of said axis intermediate the beginning and ending of that particular one of said at least certain ones of said runners which has the greatest span in the direction along said axis between its beginning and its ending.

17. The combination set forth in claim 16 wherein said plenum zone comprises and entrance at said one lengthwise end thereof and an entrance conduit that extends from said entrance and is embodied in said single plastic part.

* * * * *